3,301,543
OXYGEN JET CUTTING MACHINES
Kenneth David Seymour Semper, Croydon, Surrey, England, assignor to Hancock & Co. (Engineers) Limited, Croydon, England, a British company
Filed Jan. 30, 1963, Ser. No. 254,927
11 Claims. (Cl. 266—23)

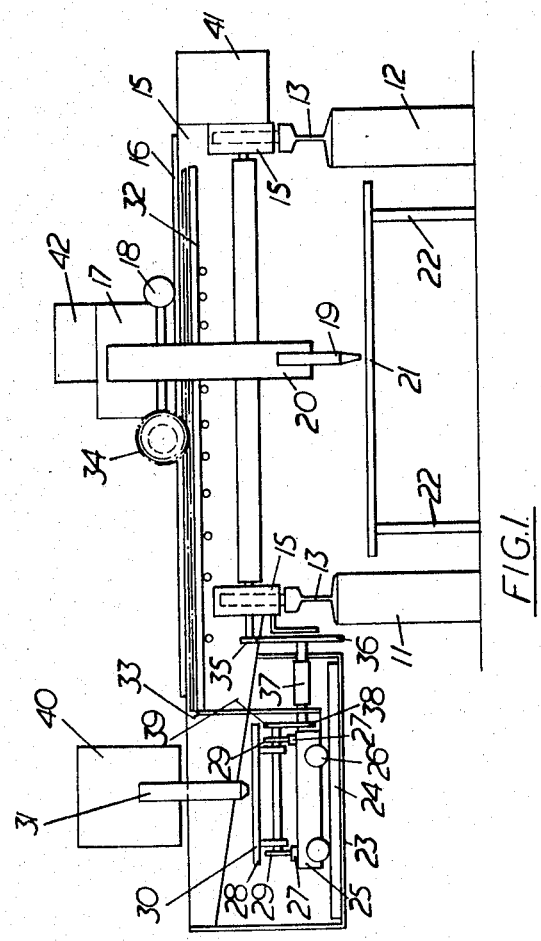

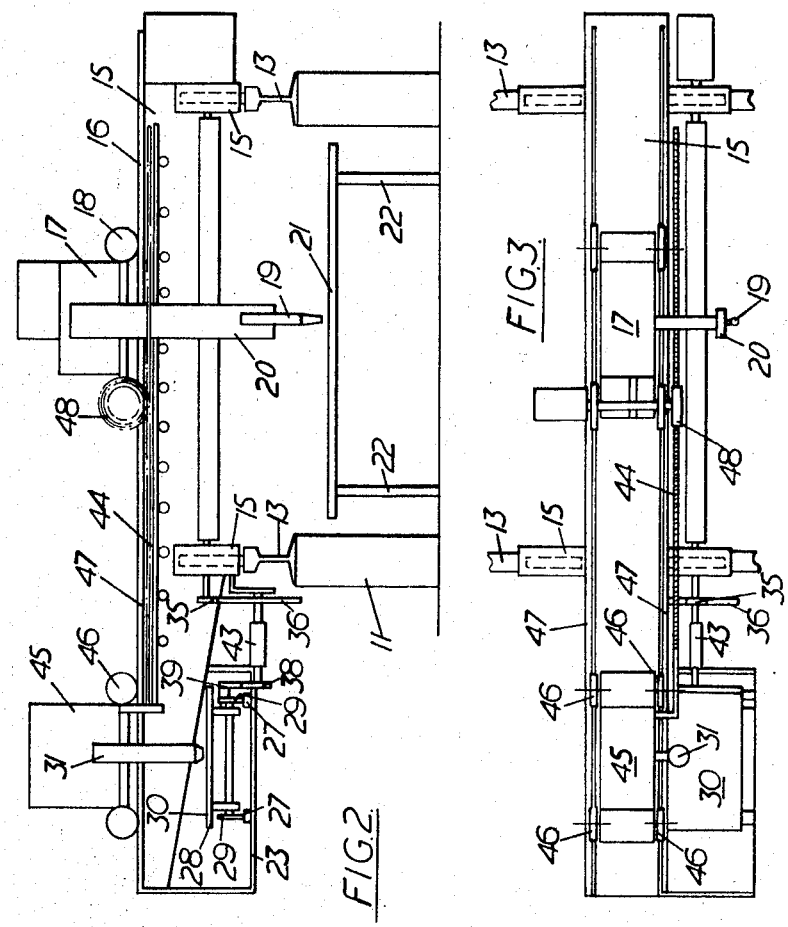

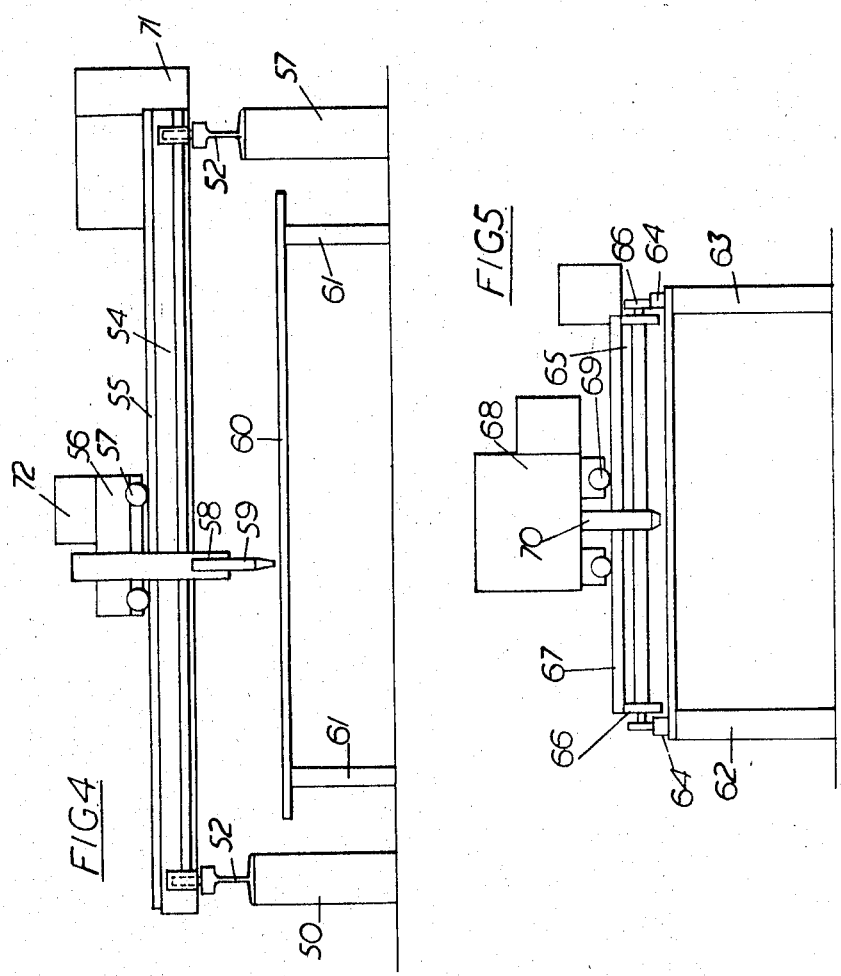

This invention relates to oxygen jet cutting machines of the kind primarily employed for cutting large plates to a predetermined profile or shape. It is principally directed to the improvement of this kind of machine when used for cutting plates to shape automatically, using an electronic following or training system which automatically follows an outline, or the edge of an outline, on a drawing, and more particularly to a machine of this kind when used for cutting very large plates by the use of a drawing on which the outline is drawn to scale and is smaller than the shape being cut.

The type of machine normally employed for this class of work is of dual carriage construction, in which a lower or longitudinal carriage is adapted to run on rails and carries a set of transverse rails on which an upper or transverse carriage is adapted to run in a direction transverse to the direction of the lower or longitudinal carriage, the oxygen jet cutting burner being carried by the upper or transverse carriage. The carriages are driven either by a single motor or by separate motors, and their movement is controlled by the electronic following device, which scans the outline on the drawing. The oxygen jet cutter moves at constant speed in all direction.

These machines may be built in any practicable size, the longitudinal and transverse dimensions of the workpiece being governed by the respective movements permitted to the longitudinal and transverse carriages.

For cutting small shapes, it is usual to use a drawing on which the outline is drawn full size and the machine then operates on a 1:1 ratio. Where large workpieces are involved, a full size drawing becomes inconvenient and unwieldy, and the method usually adopted is to provide a scale drawing in which the outline is, for example, one tenth full size, and to provide movement multiplying means so that the oxygen jet cutter moves over an area in which the longitudinal and transverse dimensions are each ten times as large as those on the drawing. In such cases, it is known practice to provide a separate small guiding machine incorporating the electronic follower and having support means for the scale drawing, and to couple the electronic follower to the main cutting machine by means of suitable transmission devices such as synchros, of which the type known as magslips are suitable. Assuming that the desired ratio is 10:1, the coupling is so arranged that, for example, a movement of the longitudinal carriage of the guiding machine by one foot will cause the longitudinal carriage of the cutting machine to move by a distance of ten feet and a movement of the transverse carriage of the guiding machine by a distance of one foot will cause the transverse carriage of the cutting machine to move by a distance of ten feet. In this way all the movements of the guiding machine are faithfully reproduced by the cutting machine, but multiplied in the ratio of 10:1. As an alternative to the coupling by means of synchros referred to above, it is known to provide mechanical coupling between the guiding machine and the cutting machine.

While, in principle, the method of scaling up the movement of the cutting machine from a small drawing is simple, it does in practice involve considerable difficulty and it results in errors which are sufficiently large to invoke criticism. The reason is that the sensing device of the normal electronic follower is given a lead, that is to say, the electronic follower device is "looking" at a portion of the outline which is slightly ahead of that actually being cut. The reason for this is to provide the control mechanism with advance information as to the direction of the outline in order to give the steering mechanism time to operate, since the steering mechanism can only operate at a certain speed. For example, if a right-angled corner is being approached then, for theoretically perfect cutting, the following device (and the oxygen jet cutter) should move up to this corner until the corner is actually reached and should then turn through the right-angle at infinite speed, so that the direction of movement both of the electronic follower and the oxygen jet cutter are instantly changed through the right-angle. This is, of course, impossible to achieve in practice, especially in large machines having heavy carriages, and by giving a lead to the electronic follower it is able to sense the corner on the drawing before it is reached by the cutter and to set the steering mechanism in motion before the cutter reaches the point at which the corner should be turned. The result is that the cutter turns through a small radius in negotiating the corner. This error can be kept reasonably small, so that it is acceptable when cutting at unity ratio. In the case of the ordinary electronic follower the lead is set to a particular amount, and it is found that if the lead is reduced below a certain minimum the apparatus must be made exceedingly sensitive and there is a considerably enhanced risk of instability in following.

When cutting to a large ratio, for example, the ratio of 10:1 previously mentioned, it is clear that the error in negotiating corners, or even fairly sharp curves, is multiplied in the same ratio and the amount of the departure of the cut workpiece from the drawing then becomes unacceptable. Attempts have, therefore, been made to eliminate the lead given to the electronic follower altogether, which can only be achieved by the use of a very much more elaborate and complicated control apparatus. It also usually involves temporarily changing the speed of the cutter. In this version of the electronic follower the photoelectric device is "looking" at exactly the same part of the image as the oxygen jet cutter is actually cutting. Such machines are much more expensive, and not very satisfactory in operation.

One object of the invention is to provide a method of cutting workpieces in an oxygen jet cutting machine to a shape corresponding to that of a scale drawing but enlarged in a desired ratio, in which the image of the portion of the outline which the electronic following device is following is magnified in substantially the same ratio as the workpiece being cut bears to the drawing.

Another object is to provide a method and apparatus for ratio cutting in which a relatively simple electronic tracing or following device, generally of known type, is used in conjunction with a scale drawing of the outline to be cut and in which use is made of an added optical system to magnify the outline as seen by the photoelectric device in the follower substantially in the same ratio as is employed in cutting, so that effectively the electronic follower is operating on a full size drawing and the error in following is reduced to what it would be in cutting at unity ratio.

By this simple and ingenious device the inherent simplicity, reliability and low cost of the unity ratio machine are retained while ratio cutting on a high ratio is achieved with a cutting error which is no larger than the normal cutting error in the unity ratio machine.

A further object of the invention is to provide an oxygen jet cutting machine for ratio cutting having longitudinal and transverse carriages in which the scale drawing of the object to be cut and the follower are carried on the longitudinal carriage and an improved mechanical transmission system is provided between the longitudinal carriage and the transverse carriage and the table carrying the drawing so that the drawing is made to move with respect to the follower in a direction opposite to that in which the longitudinal and transverse carriages move and with its speed reduced in the desired ratio.

Still another object is to provide a ratio cutting machine having an optical system to magnify the image of the outline as seen by the photoelectric portion of the follower in a desired ratio, the drawing being carried on the longitudinal carriage, and mechanical transmission means between the longitudinal carriage and the table carrying the drawing to cause the table to move with respect to the longitudinal carriage in the opposite direction to the direction of the longitudinal table with respect to its rails and with its speed reduced in the desired ratio, and further transmission means between the transverse carriage and the follower to cause the follower to move in the same direction as the movement of the transverse carriage but with its speed reduced in the desired ratio.

An additional object is to provide an oxygen jet cutting machine for ratio cutting having a separate guiding machine provided with an electronic follower having a magnifying optical system which magnifies the image presented to the photoelectric portion of the follower in a desired ratio, and transmission means between the cutting machine and the guiding machine to produce movements of the electronic follower corresponding to the movements of the oxygen jet cutter but reduced in speed in substantially the same ratio.

Other and further objects will appear in the course of a study of the following description of several embodiments of the invention.

The electronic follower may be of any known type. It may be of the type known as an edge follower, which makes use of a drawing in which the shape to be cut is completely blacked or coloured in, or the outline is very thick, the follower scanning the outer edge of the shape or the thick line. Alternatively, and preferably, the electronic follower may be of the more modern line follower type in which the outline on the drawing is constituted by a black line of uniform thickness.

In order that the invention may clearly be understood a description of a known type of electronic line follower is given below, it being understood that for use in the invention the follower, whatever its type, is modified by the inclusion of an optical system which provides the magnification of the portion of the outline being scanned, as described above.

In this known form of prior art electronic following device the drawing bearing the outline is brightly illuminated in the region which the photoelectric device in the follower "sees" at any instant and an image of a part of the outline is projected upwardly through an optical system, so that an image of approximately full size is focussed, either on the photocell or on a screen viewed by the photocell.

The photocell is mounted on the lower end of a bar which is carried by a spring. A permanent magnet is fixed to the upper end of the bar and the whole is suspended under the poles of an A.C. electro-magnet, excitation of which causes the sprung bar with photocell to oscillate at mains frequency, i.e., 50 cycles per second. As the photocell oscillates it passes back and forth over the image of the line beneath the scanner head.

The vibration of the scanning photocell is such that when the optical axis is directly over the line of the pattern, the photocell has focussed upon it in turn, equal amounts of light during each pass over the line. Since the photocell vibrates at 50 cycles per second, this results in a photocell signal at twice this frequency.

These signals are amplified and applied to one stator winding of a two phase servo motor, this winding being generally known as the control winding. The other stator winding is energised from the supply mains and is generally known as the reference winding.

The speed and direction of the rotor rotation is determined by the magnitude and phase of the current in the control winding in relation to the current in the reference winding.

If the image of the line is displaced from the centre of the photocell's arc of oscillation the current through the photocell will produce a waveform of 100 cycles with the amplitude of alternate impulses greater than the remainder, and the amplitude of the alternate impulses will be large or small in relation to the remainder according to which side of the centre of the photocell's arc of oscillation the image of the line is displaced.

The resultant control voltage, obtained through the amplification of these signals and applied to the control winding of the motor, will produce a field which will react with the field of the reference winding to produce a rotation of the rotor, the speed and direction of which is determined by the voltage of the control winding and the phase relation it bears to the reference winding.

The rotation of the rotor forms the basis of the control mechanism for steering the machine to the outline of the drawing and this steering action is communicated to control gear which alters the relative speeds or the direction of rotation of the motors driving the longitudinal and transverse carriages, so that the direction of the oxygen jet cutter is changed to correspond with the deviation of the outline. If the electronic follower is negotiating an angle between two straight portions of the outline, then as soon as the direction of movement of the photoelectric follower has been changed so that it follows the new direction of the outline the steering motor stops and both the oxygen jet cutter and the follower continue to move in straight lines in the new direction. If, however, the photoelectric follower is following a curve then a continuous correction is applied, the steering motor runs continuously and the motors driving the longitudinal and transverse carriages are changing speed continually, so that the oxygen jet cutter is changing direction continually, the follower being also caused to change its direction continuously to enable it to follow the curve.

In order that the steering mechanism and the control gear which controls the carriage motor or motors may have time to operate, the photoelectric portion of the follower is given a lead, that is to say, it looks at a portion of the outline slightly in advance of the point at which the cutter is operating. This is achieved by mounting the photoelectric device off centre, and in front of, the vertical steering axis of the follower, so that the photocell swings in an arc.

Several embodiments of the invention will now be described, by way of example, with reference to the accompanying drawings, in which:

FIGURE 1 is a diagram showing the arrangement of an oxygen jet cutting machine according to one embodiment of the invention;

FIGURE 2 is a similar diagram showing an oxygen jet cutting machine according to another embodiment of the invention;

FIGURE 3 is a diagrammatic plan view of the embodiment of FIGURE 2;

FIGURES 4 and 5 are diagrams showing a cutting machine and a guiding machine according to a third embodiment of the invention.

Figure 6:
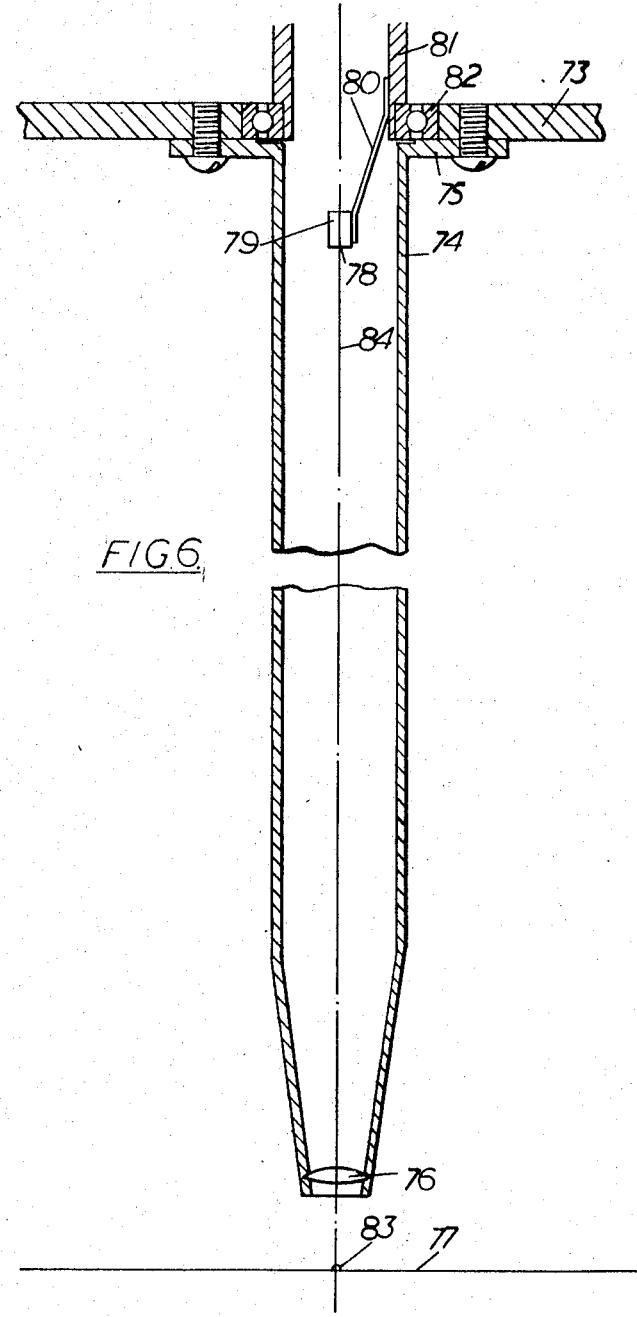
FIGURE 6 is a section of a part of an electronic follower.

Referring first to FIGURES 1 and 2, an oxygen jet cutting machine particularly adapted for ratio cutting comprises a bed which is represented by two columns 11 and 12. A pair of longitudinal rails 13 is mounted on the columns 11 and 12, the direction of the longitudinal rails being normal to the plane of the drawing. A longitudinal carriage represented diagrammatically by framework 15 is provided with wheels adapted to run freely on the rails 13, the wheels being mounted on axles. Mounted on the longitudinal carriage 15 is a pair of transverse rails 16 set at right-angles to the longitudinal rails 13. A transverse carriage 17 is provided with wheels 18 which run on the transverse rails 16, so that the transverse carriage 17 may run freely in a direction transverse to that of the longitudinal carriage. An oxygen jet cutter 19 is carried on a support 20 depending from the carriage 17, so that the cutter 19 is able to move, with the transverse carriage, in all directions in a plane above that of a workpiece 21, which is supported between the rails 13, the supporting means being represented by columns 22 on the drawing.

The longitudinal carriage 15 is provided with framework 23 extending on one side of the rails 13 and within this framework is mounted a pair of transverse drawing table rails 24. A lower or transverse drawing table carriage 25 is provided with wheels 26 by which it may run freely along the transverse drawing table rails 24. The transverse drawing table carriage 25 is provided with a pair of longitudinal rails 27 parallel to the longitudinal rails 13 and an upper or longitudinal drawing table carriage 28 is mounted on wheels 29 which are adapted to run freely on the drawing table longitudinal rails 27. The upper flat surface 30 of the longitudinal drawing table carriage provides a flat horizontal surface on which a drawing may be laid, the drawing carrying an image of an outline to be cut, the image being on a reduced scale and the reduction being in a desired ratio with respect to the shape and size of the workpiece to be cut.

An electronic line following device 31, which may be a modification of a known type, is fixed to the longitudinal carriage 15.

From the foregoing description it will be clear that the drawing table is itself carried on the longitudinal carriage, as is the photoelectric follower 31, and the drawing carried on the drawing table may be moved in all directions with the drawing table under the fixed photoelectric follower 31.

A rack 32 is disposed parallel to the transverse rails 16 on the longitudinal carriage 15 and is coupled by its end 33 to the transverse drawing table carriage 25. A gear 34 is rigidly attached or coupled to one of the axles carrying the wheels 18 and engages the teeth of the rack 32. The pitch circle of the teeth of the gear 34 is 1¹/₁₀ of the diameter of the wheels 18 so that when the transverse carriage 17 is moved along the rails 16 the rack 32 is moved in the transverse direction with respect to the longitudinal carriage 15, in the opposite direction to the movement of the transverse carriage 17 and at ¹/₁₀ the speed thereof.

Rigidly attached to one of the axles carrying the wheels of the longitudinal carriage 15 is a gear 35 which meshes with a gear 36, the gear 36 being mounted on one end of a telescopic shaft 37. Mounted on the other end of the telescopic shaft 37 is a further gear 38 which meshes with a rack 39 carried on the drawing table longitudinal carriage 28. Gears 35 and 36 provide a 5:1 speed reduction, and the gear 38 and the rack 39 are arranged to provide a 2:1 speed reduction so that when the longitudinal carriage 15 is moved along the rails 13 the drawing table upper carriage 28 is moved in the opposite direction with respect to the longitudinal carriage 15 at ¹/₁₀ the speed at which the longitudinal carriage 15 is travelling along the rails 13.

Two motors (not shown) are provided respectively to drive the longitudinal carriage 15 along the rails 13 and to drive the transverse carriage 17 along the rails 16. These motors are direct current motors with separately excited fields.

Since the drawing table is moved as the result of movements of the wheels of the two main carriages along their rails it will be evident that if the wheels should slip on the rails the cutter and the follower will run out of phase. Slip is extremely unlikely to occur but it may be prevented by providing a further rack on each of the main carriages engaged by a gear on the axle of the respective carriage having a pitch diameter exactly equal to the diameter of the respective running wheels.

The electronic follower 31 is provided with any of the known types of scanning device, for example, it may be arranged that a photoelectric cell is vibrated in a direction transverse to the direction of the portion of the image being seen and is arranged to provide signals of one type or another depending upon the direction in which the outline deviates from the direction in which the photoelectric follower is instantly moving, as described earlier. These signals cause a steering motor (not shown) mounted in the casing 40 which carries the follower 31 to run in one direction or the other when the outline deviates. As the follower 31 rotates, its rotation is transmitted to two arms of a potentiometer consisting of a resistance winding toroidally formed on a ring. The resistance winding is continuous, that is to say, its ends are joined together, and four connections are brought out from the winding at points which are mutually at right angles to each other. The potentiometer is connected to a centre-tapped D.C. power supply, the extreme positive and negative terminals thereof being connected to opposite points on the potentiometer and the centre tap, representing zero volts, being connected to the remaining two points. The potentiometer has two arms placed at right angles to each other and one of these arms is connected through suitable amplifying means to one armature terminal of the motor driving the longitudinal carriage 15 on the rails 13, the motor being mounted in a casing 41 attached to the longitudinal carriage, the remaining armature terminal being connected to the centre tap. If the arm is at the positive point on the potentiometer, the motor driving the longitudinal carriage 15 runs at full speed in one direction, and if the spindle of the potentiometer is rotated through 180° the motor runs at full speed in the opposite direction. At intermediate positions of the arm the motor runs at a reduced speed in one direction or the other, depending upon the particular setting, while if the arms is at either of the zero voltage points on the potentiometer then no voltage is applied to the motor armature and the longitudinal carriage 15 is stationary. The second arm of the potentiometer is coupled through suitable amplifying means to one armature terminal of the motor which drives the transverse carriage 17, and this motor may conveniently be mounted in a casing 42 on the transverse carriage. The second armature terminal of this motor is also connected to the zero voltage point in the circuit. With this arrangement, if the longitudinal carriage 15 is being driven at full speed in one direction or the other, the transverse carriage 17 is stationary, and if the transverse carriage 17 is being driven at full speed in one direction or the other, the longitudinal carriage is stationary. At intermediate settings of the potentiometer both carriages are being driven at intermediate speeds. Since the voltages applied to the two armatures vary according to sine and cosine ratios the speed of movement of the oxygen jet cutter 19 remains constant whatever its direction of movement may be, its direction of movement at any instant being compounded of the rectilinear movements of the longitudinal carriage 15 and the transverse carriage 17. Since the drawing table longitudinal carriage is driven at ¹/₁₀ the speed of the longitudinal and transverse carriages, its movement with respect to the photoelectric follower is also constant, but its speed is ¹/₁₀ of the speed of the oxygen jet cutter 19.

A further potentiometer may be provided to vary the speeds of both motors simultaneously and thus to control the cutting speed.

The normal electronic tracer has a lens systems built into it which projects an image of the part of the outline being followed either directly on to the photoelectric cell or on to a screen which is "seen" by the photoelectric cell.

According to the principal feature of the invention, the optical system is arranged to magnify the image projected either on to the photocell, as will be more particularly explained later, in relation to FIGURE 6, or on to a screen.

Referring now to FIGURE 3, the machine shown diagrammatically is of the same general form and the same reference numbers are used where they are applicable. In this case also the machine stands on a bed composed of two pillars 11 and 12 which support two longitudinal rails 13 upon which a carriage 15 is adapted to run. The longitudinal carriage 15 carries the transverse rails 16 upon which the transverse carriage 17 runs on wheels 18 supporting the oxygen jet cutter 19 from a depending support 20, the cutter moving over the surface of the workpiece 21 which is supported on the supports 22. The transverse carriage 15 carries the structure 23 at one side but, in this instance, the transverse drawing table rails 24 are omitted and the longitudinal drawing table rails 27 are mounted directly on the structure 23. The drawing table 28 runs on wheels 29 along the rails 27. In this instance the drawing table is only capable of longitudinal movement and this movement is provided by the gear 35 fixed to one of the axles of the longitudinal carriage wheels driving the gear 36 fixed to a solid shaft 43 (the telescopic shaft being unnecessary) there being a further gear 38 fixed to the other end of the shaft 43 which engages the rack 39.

A rack 44, which replaces the rack 32 of FIGURES 1 and 2, is coupled to a follower carriage 45 which supports the photoelectric follower 31. The follower carriage 45 is mounted on wheels 46 which run on transverse rails 47, which are parallel to the rails 16 and may conveniently be an extension of the rails 16. As in the case of FIGURE 1 a gear 48 is mounted on one of the axles which carries the wheels 18 but, in this case, the pitch circle of the gear 48 is only $9/10$ of the diameter of the wheels 18, so that as the carriage 17 is moved in one direction or the other the follower carriage 45 is moved in the same direction but at $1/10$ the speed of the transverse carriage 17. It will be seen that the relative movement between the photoelectric follower 31 and the drawing table 28 is exactly the same as in the construction of FIGURE 1, but the alternative construction of FIGURE 2 may be of advantage in some instances. The functioning of the whole apparatus is as previously described.

FIGURES 4 and 5 show a further arrangement in which the cutting machine shown in FIGURE 4 and the guiding or follower machine with its drawing table shown in FIGURE 5 are separate. The cutting machine shown in FIGURE 4 comprises columns 50 and 51 between them carrying a pair of longitudinal rails 52 upon which the wheels of a longitudinal carriage 54 may run. The longitudinal carriage 54 carries a pair of transverse rails 55 upon which a transverse carriage 56 is adapted to run on wheels 57. A support 58 depending from the carriage 56 carries the oxygen jet cutting burner 59 so that the latter may move over the workpiece 60 supported on the supports 61. The guiding or following machine comprises columns 62 and 63 carrying a pair of rails 64 on which a longitudinal carriage 65 may run on wheels 66. The carriage 65 carries a pair of transverse rails 67 on which a transverse carriage 68 may run on wheels 69. The transverse carriage 68 carries a photoelectric follower device 70. The longitudinal and transverse carriages 54 and 56 are driven by motors as previously described which may be accommodated in housings 71 and 72 and the movement of the carriages 54 and 56 is transmitted from the cutting machine of FIGURE 4 to the following or guiding machine of FIGURE 5 by means of a synchro or magslip system, which is not shown, but the use and arrangement of which is very well known, so that the system does not need any further description. In this case also the photoelectric follower device 70 contains a lens which magnifies the portion of the outline presented to the photoelectric cell in substantially the same ratio as the ratio between the size of the workpiece being cut and the image thereof on the drawing.

In operation, the two motors drive the longitudinal and transverse carriages 54 and 72 of the cutting machine in accordance with the voltages provided by the mechanism contained in the casing 68 of the guiding machine and the movement of the carriages of the cutting machine are transmitted and reproduced in the corresponding carriages of the guiding machine but with the movement reduced by any convenient means, such as gearing, in the desired ratio so that the carriages 65 and 68 are enabled to follow the outline and continue to steer the carriages 54 and 56 of the main guiding machine of FIGURE 4 to ensure that the workpiece is of the same shape as the image on the drawing out of enlarged size.

Referring now to FIGURE 6 the power part of an electronic following device is shown in section. This comprises a support 73 which is a part of the supporting means for the electronic follower shown in FIGURES 1, 2, 3 and 5. Underneath the support 73 is a tube 74 having a flange 75 at its upper end by which it is secured to the support 73. The lower end of the tube 74 is tapered downwardly in diameter and near its bottom is a magnifying lens 76. The focal length and other characteristics of the lens are so chosen and the vertical height of the tube 74 is such that when the image on the drawing 77 is in focus, with the lower end of the tube 76 at a convenient height above the drawing 77, the image projected on to the lower sensitive face 78 of a photoelectric device 79 is magnified in substantially the same ratio as that of the speeds of the cutting and following devices, which, in the examples previously discussed, was ten times. The photoelectric device 79, which may conveniently be a photo-transistor, is mounted on a spring arm 80 which is attached to the interior surface of another tube 81 located co-axially above the tube 74. A ball bearing 82 is interposed between the support 73 and the tube 81 and the latter is supported in a further bearing at its upper end, which is not shown. The tube 81 is thus rotatable, and in rotating it turns the photoelectric device 79. As shown, the outline being followed would run in a direction normal to the plane of the drawing and is represented by the raised portion 83 on the surface 77. The electronic following device as a whole would move along the line 83 and follow any deviation. The axis of the photoelectric device 79 is displaced from the axis 84 of the tube 74, the axis of the photoelectric device 79 being in front of the axis 84 as seen by an observer looking at the drawing. As represented on the drawing the direction of movement of the follower would be away from the said observer. Thus when the tube 81 is rotated the photoelectric device 79 follows an arc and the displacement between the axis of the photoelectric device 79 and the axis 84 represents the lead given to the follower.

The spring arm 80 is vibrated at a chosen frequency—which is conveniently the supply mains frequency—by means of an A.C. magnet (not shown) which is disposed within the tube 74, but is attached to the tube 81, so that it turns with the tube 81 and with the spring arm 80 and photoelectric device 79.

The remainder of the photoelectric following device and its mode of operation may be in accordance with the known art and as described earlier in this specification. The modifications required to obtain the benefits of the invention are merely the provision of a considerably longer tube 74 and an appropriate magnifying lens 76. With these simple changes the invention thus provides the advantages of simplicity, reliability and low cost which are associated with the unity ratio oxygen jet cutting machine and at the same time provides magnified ratio cutting with a cutting error which is no larger than that normally associated with the unity ratio machine.

I claim:

1. An oxygen jet cutting machine comprising a pair of longitudinal rails, a longitudinal carriage adapted to run along the longitudinal rails, a pair of transverse rails mounted on the longitudinal carriage, a transverse carriage adapted to run along the transverse rails, an oxygen jet cutting burner carried on the transverse carriage, drawing table transverse carriage rails mounted on the longitudinal carriage at right angles to the direction of the longitudinal carriage rails, a drawing table transverse carriage movable along the drawing table transverse carriage rails, drawing table longitudinal carriage rails carried on the drawing table transverse carriage and laid parallel to the longitudinal carriage rails, a drawing table longitudinal carriage carrying a drawing table to support a drawing containing an outline of a shape to be cut movable along the drawing table longitudinal carriage rails, a photoelectric following device having a lead adapted to scan the outline to deliver steering signals when said outline deviates from a straight line, a steering motor responsive to signals from the photoelectric device to steer the following device to cause it to follow the deviated outline, first transmission means including a telescopic shaft coupling the drawing table longitudinal carriage to one axle of the longitudinal carriage to cause the drawing table longitudinal carriage to move with respect to the longitudinal carriage in the opposite direction at a speed which is reduced in a desired ratio with respect to the speed and direction of the longitudinal carriage along its rails, second transmission means between the transverse carriage and the drawing table transverse carriage to cause the drawing table transverse carriage to move in the same direction as the transverse carriage but with its speed reduced in the desired ratio, and an optical system in the following device to magnify the portion of the image of the outline as seen by the photoelectric device in the desired ratio.

2. A machine as claimed in claim 1 in which the first transmission means comprises toothed gearing coupled to the said one axle of the longitudinal carriage and a rack on the longitudinal drawing table carriage engaged thereby, the telescopic shaft enabling transverse movement of the drawing table transverse carriage, the ratio of the gearing being such as to produce the desired speed reduction and direction of movement.

3. A machine as claimed in claim 1 in which the second transmission means comprises a rack lying parallel to the transverse carriage rails coupled to the transverse drawing table carriage and movable therewith, and a gear engaging the rack mounted on an axle of the transverse carriage, the speed reduction in the desired ratio being obtained by making the pitch circle of the gear smaller than the longitudinal carriage wheel diameter in the ratio one to one minus the cutting ratio expressed as a fraction, the photoelectric following device being fixed to the longitudinal carriage above the drawing table.

4. A machine as claimed in claim 1 in which the following device comprises a fixed vertical tube, a lens in the lower end of the tube, a second tube mounted above the said tube co-axial therewith and adapted for rotation, a vibratable arm carried by the second tube adapted to be vibrated at a chosen frequency, a photoelectric device carried on the vibratable arm, the said lens being set to project an image on to the photoelectric device magnified in the said ratio, the axis of the photoelectric device being offset from the common axis of the tubes so that the portion of the image being scanned by the photoelectric device is ahead of the axis of the said tube in the direction of movement of the follower.

5. An oxygen jet cutting machine comprising a pair of longitudinal rails, a longitudinal carriage adapted to run along the longitudinal rails, a pair of transverse rails mounted on the longitudinal carriage, a transverse carriage adapted to run along the transverse rails, an oxygen jet cutting burner carried on the transverse carriage, a pair of drawing table longitudinal rails on the longitudinal carriage, a drawing table carriage supporting a drawing table to carry an outline of a shape to be cut movable along the drawing table longitudinal rails, a photoelectric following device having a lead adapted to scan the outline and to deliver steering signals when said outline deviates from a straight line, a steering motor responsive to signals from the photoelectric following device to steer the following device and to cause it to follow the deviated outline, first transmission means between one axle of the longitudinal carriage and the drawing table carriage to cause the drawing table carriage to move along its rails in a direction opposite to the direction in which the longitudinal carriage runs along its rails and at a speed with respect to the longitudinal carriage which is reduced in a desired ratio with respect to the speed of the longitudinal carriage along its rails, follower transverse rails on the transverse carriage parallel to the transverse carriage rails, a follower carriage supporting the following device and movable along the follower carriage rails, second transmission means coupling the follower carriage to the transverse carriage to cause the follower carriage to move in the opposite direction to the transverse carriage with its speed reduced in the desired ratio, and an optical system in the following device to magnify the portion of the image of the outline as seen by the photoelectric device in the desired ratio.

6. A machine as claimed in claim 5 in which the first transmission means comprises toothed gearing connected to the said one axle of the longitudinal carriage and a rack on the drawing table carriage engaged by the gearing.

7. A machine as claimed in claim 5 in which the second transmission means comprises a rack coupled to the follower carriage and movable therewith, and a gear engaging the rack attached to one axle of the transverse carriage, the pitch diameter of the gear being larger than the diameter of the transverse carriage wheels in the ratio one plus the cutting ratio expressed as a fraction.

8. A machine as claimed in claim 5 in which the following device comprises a fixed vertical tube, a lens in the lower end of the tube, a second tube mounted above the said tube co-axial therewith and adapted for rotation, a vibratable arm carried by the second tube adapted to be vibrated at a chosen frequency, a photoelectric device carried on the vibratable arm, the said lens being set to project an image on to the photoelectric device magnified in the said ratio, the axis of the photoelectric device being offset from the common axis of the tubes so that the portion of the image being scanned by the photoelectric device is ahead of the axis of the said tube in the direction of movement of the follower.

9. An oxygen jet cutting machine comprising a pair of longitudinal rails, a longitudinal carriage adapted to run along the longitudinal rails, a pair of transverse rails mounted on the longitudinal carriage, a transverse carriage adapted to run along the transverse rails, an oxygen jet cutting burner carried on the transverse carriage, a guiding machine separate from the oxygen jet cutting machine comprising a pair of longitudinal rails, a longitudinal carriage adapted to run on the longitudinal rails, transverse rails mounted on the longitudinal carriage, a transverse carriage adapted to run on the transverse rails, a photoelectric following device having a lead adapted to scan the outline and to deliver steering signals when said outline deviates from a straight line, a photoelectric following device carried on the transverse carriage, an optical system in the following device to magnify the portion of the image of the outline as seen by the photoelectric device in a desired ratio, a steering motor responsive to signals from the photoelectric following device to steer the following device and to cause it to follow the deviated outline, and transmission means between the oxygen jet cutting machine and the tracing machine to cause the follower to be moved over the drawing table in exactly the same direction as the oxygen jet cutting burner is moved but with its speed reduced in the desired ratio.

10. A machine as claimed in claim 9 in which the transmission means comprises a synchro system and gearing.

11. A machine as claimed in claim 9 in which the following device comprises a fixed vertical tube, a lens in the lower end of the tube, a second tube mounted above the said tube coaxial therewith and adapted for rotation, a vibratable arm carried by the second tube adapted to be vibrated at a chosen frequency, a photoelectric device carried on the vibratable arm, the said lens being set to project an image on to photoelectric device magnified in the said ratio, the axis of the photoelectric device being offset from the common axis of the tubes so that the portion of the image being scanned by the photoelectric device is ahead of the axis of the said tube in the direction of movement of the follower.

References Cited by the Examiner

UNITED STATES PATENTS

| | | | |
|---|---|---|---|
| 2,989,639 | 6/1961 | Dulebohn et al. | 250—202 |
| 3,037,888 | 6/1962 | Lobosco et al. | 250—202 |
| 3,058,733 | 10/1962 | Steventon et al. | 266—23 |
| 3,063,698 | 11/1962 | Hancock | 90—62 |
| 3,069,298 | 12/1962 | Stellmacher | 148—9 |
| 3,105,907 | 10/1963 | Colten et al. | 250—202 |
| 3,124,691 | 3/1964 | Brouwer | 250—202 |

JOHN F. CAMPBELL, *Primary Examiner.*

DAVID L. RECK, O. MARJAMA, L. J. WESTFALL,
*Assistant Examiners.*